(12) United States Patent
Braveman et al.

(10) Patent No.: US 8,823,996 B2
(45) Date of Patent: Sep. 2, 2014

(54) IMAGE FORMING DEVICES, HARD IMAGING METHODS, AND METHODS OF DETERMINING A TRANSFER FUNCTION

(75) Inventors: Gregory Braveman, Herzeliya (IL); Ruth Bergman, Haifa (IL); Shlomo Harush, Nes-Ziyona (IL); Eyal Shelef, Tel Aviv (IL); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 2242 days.

(21) Appl. No.: 11/591,267

(22) Filed: Oct. 31, 2006

(65) Prior Publication Data

US 2008/0246978 A1    Oct. 9, 2008

(51) Int. Cl.
| | |
|---|---|
| *G06K 15/00* | (2006.01) |
| *H04N 1/60* | (2006.01) |
| *G06K 15/02* | (2006.01) |
| *H04N 1/407* | (2006.01) |
| *B41J 29/393* | (2006.01) |
| *H04N 1/40* | (2006.01) |

(52) U.S. Cl.
CPC ............... *G06K 15/02* (2013.01); *H04N 1/60* (2013.01); *G06K 15/027* (2013.01); *H04N 1/4078* (2013.10); *B41J 29/393* (2013.01); *H04N 1/40006* (2013.01)
USPC ......... 358/1.18; 358/3.1; 358/3.11; 358/3.12; 358/3.23

(58) Field of Classification Search
None
See application file for complete search history.

(56) References Cited

U.S. PATENT DOCUMENTS

| | | | |
|---|---|---|---|
| 6,027,201 A * | 2/2000 | Edge | 347/19 |
| 6,327,450 B1 | 12/2001 | Ito | |
| 6,803,933 B1 * | 10/2004 | Staelin et al. | 347/131 |
| 6,917,448 B2 | 7/2005 | Koifman et al. | |
| 2003/0065491 A1 * | 4/2003 | Roberts | 703/2 |
| 2005/0093907 A1 * | 5/2005 | Staelin et al. | 347/15 |
| 2005/0111017 A1 * | 5/2005 | Takahashi et al. | 358/1.9 |

OTHER PUBLICATIONS

"Dot Gain Table Prediction for the HP Indigo Press"; Staelin, Carl; 2004; 22 pp.
"Dot Gain Table and Developer Voltage Predictioin for the HP Indigo Press"; Staelin et al.; 2005, 5 pp.

* cited by examiner

*Primary Examiner* — Jacky X Zheng

(57) ABSTRACT

Image forming devices, hard imaging methods, and methods of determining a transfer function are described. According to one embodiment, an image forming device includes an image engine configured to provide a marking agent upon media, processing circuitry configured to control the image engine to form a test image upon the media having a specified coverage of the marking agent and to access measurement data indicative of a measured coverage of the marking agent of the test image, storage circuitry configured to store data comprising associations of a plurality of specified coverage values of the marking agent and a plurality of resultant coverage amounts of the marking agent formed upon the media by the image engine corresponding to respective ones of the specified coverage values, and wherein the processing circuitry is further configured to access image data of an image to be formed to identify one of the specified coverage values of the marking agent to be formed upon the media to form the image, to modify the one specified coverage value using the stored data and the measurement data to provide an imaging coverage value, and to control the image engine using the imaging coverage value to form the hard image.

14 Claims, 6 Drawing Sheets

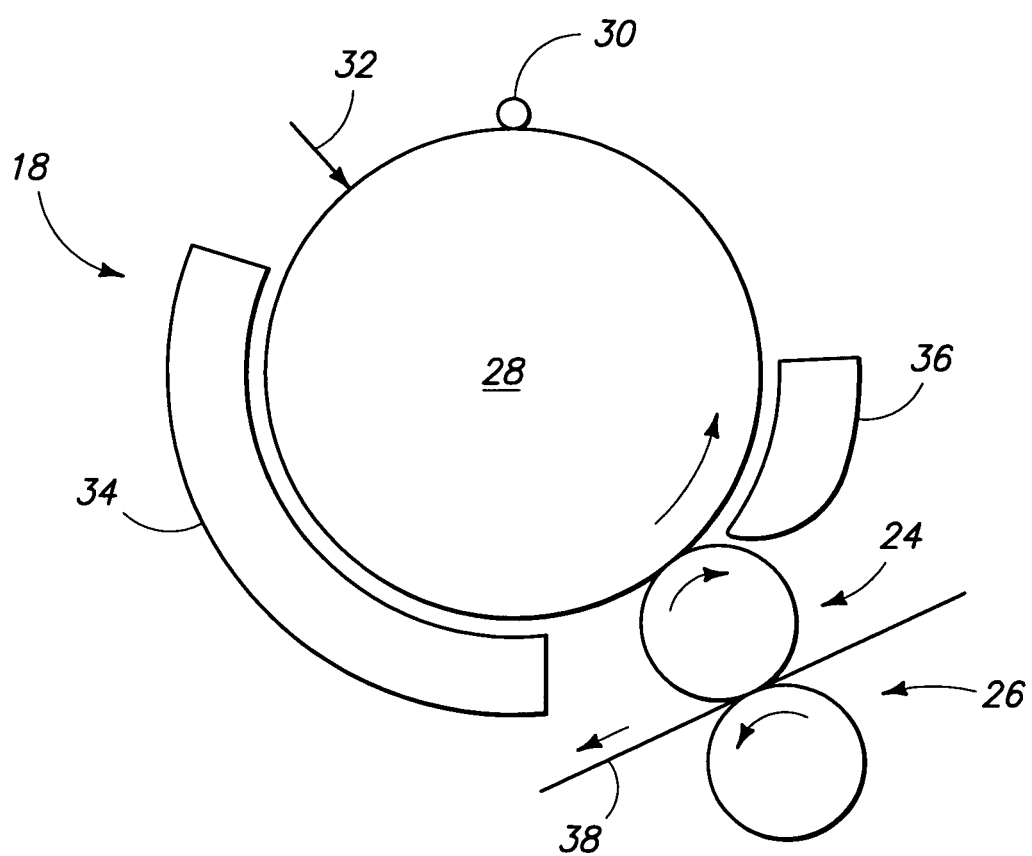

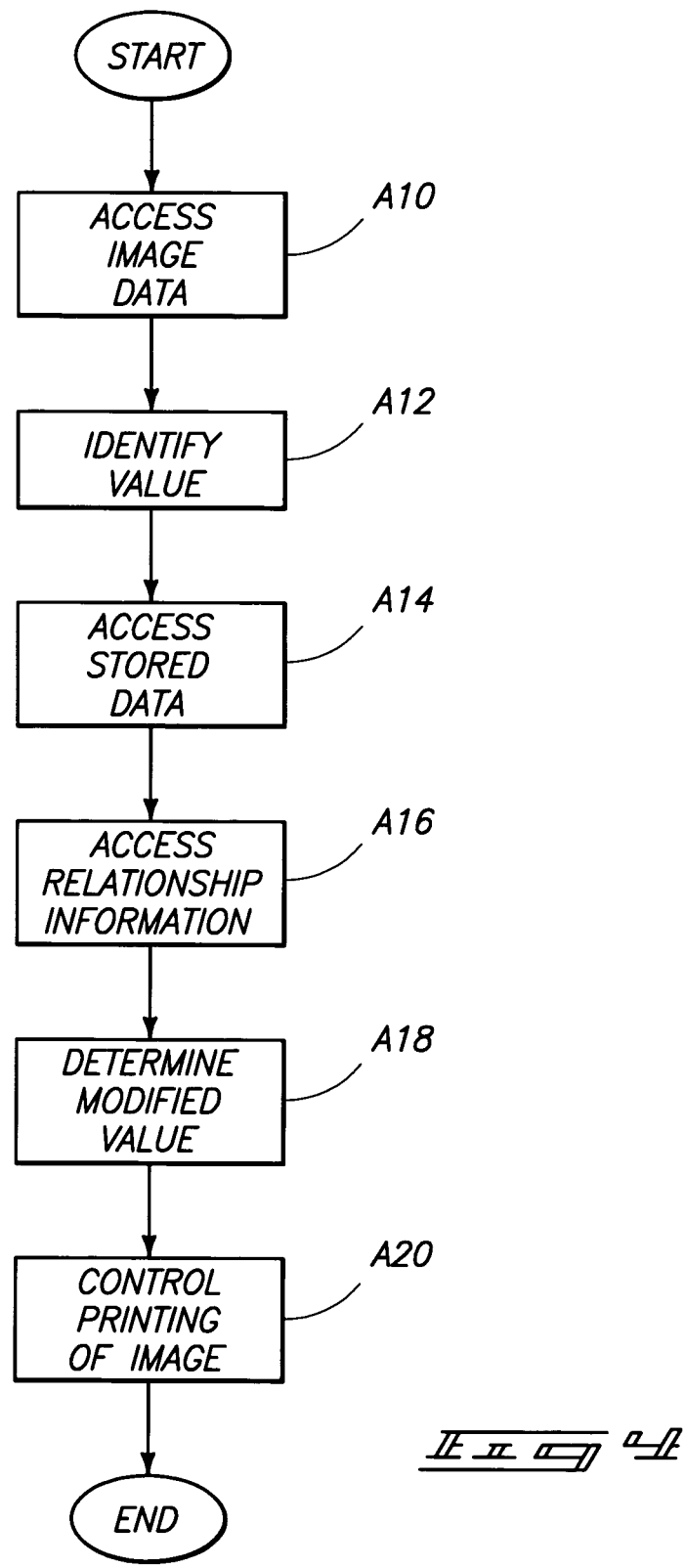

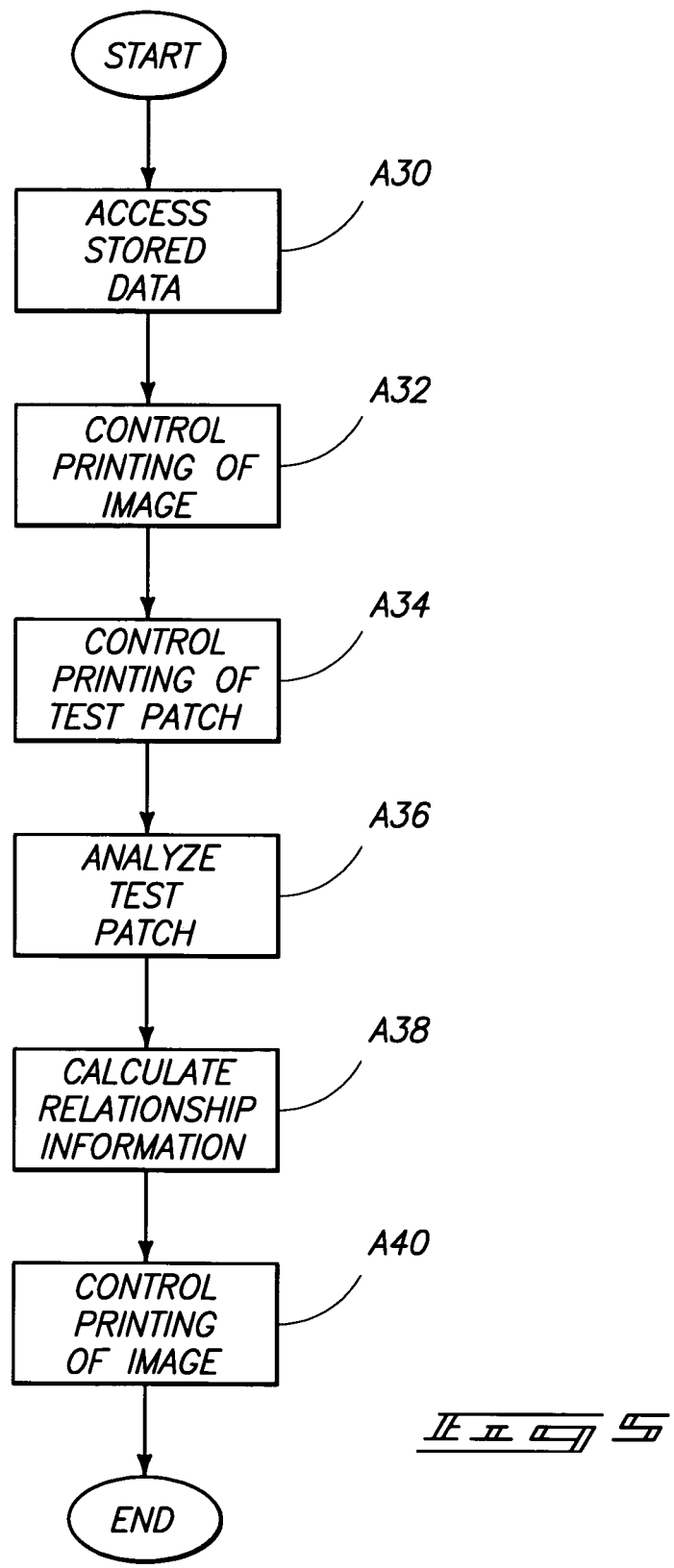

IMAGE FORMING DEVICES, HARD IMAGING METHODS, AND METHODS OF DETERMINING A TRANSFER FUNCTION

FIELD OF THE DISCLOSURE

Aspects of the disclosure relate to image forming devices, hard imaging methods, and methods of determining a transfer function.

BACKGROUND OF THE DISCLOSURE

Imaging devices capable of printing images upon paper and other media are becoming increasingly popular and used in many applications including color reproduction. For example, laser printers, ink jet printers, and digital printing presses are but a few examples of imaging devices in wide use today for black and white or color imaging.

Digital printing presses are relatively new compared with other printing technologies and may be used in place of other printing arrangements, such as analog printing presses. In one imaging example utilizing a press, a plurality of copies of the same image may be reproduced in relatively high volumes (e.g., printing business cards, catalogs, publications, etc.).

Some imaging devices are susceptible to shifting of colors over time due to process drift in an imaging device. Some shift may be attributed to dot gain or shifts in dot gain of an imaging device where dot gain is the relationship of a printed dot area divided by a digital dot area (corresponding to an area of a dot intended to be printed).

At least some embodiments of the disclosure describe methods and apparatus which provide improved image formation upon media.

SUMMARY

According to some aspects of the disclosure, image forming devices, hard imaging methods, and methods of determining a transfer function are described.

According to one aspect, an image forming device comprises an image engine configured to provide a marking agent upon media, processing circuitry configured to control the image engine to form a test image upon the media having a specified coverage of the marking agent and to access measurement data indicative of a measured coverage of the marking agent of the test image, storage circuitry configured to store information comprising associations of a plurality of specified coverage values of the marking agent and a plurality of resultant coverage amounts of the marking agent formed upon the media by the image engine corresponding to respective ones of the specified coverage values, and wherein the processing circuitry is further configured to access image data of an image to be formed to identify one of the specified coverage values of the marking agent to be formed upon the media to form the image, to modify the one specified coverage value using the stored information and the measurement data to provide an imaging coverage value, and to control the image engine using the imaging coverage value to form the hard image.

According to another aspect, a hard imaging method comprises first accessing image data of a hard image to be formed, using the image data, identifying a specified coverage value corresponding to a coverage of a marking agent to be formed to produce a hard image, second accessing stored data indicative of dot gain of an image forming device at a first moment in time before the first accessing, third accessing correction information indicative of a change of the dot gain between the first moment in time and a second moment in time corresponding to the first accessing, determining a modified coverage value using the stored information and the correction information, and controlling an image engine of the image forming device to form the hard image using the modified coverage value.

Other embodiments and aspects are described as is apparent from the following discussion.

DESCRIPTION OF THE DRAWINGS

FIG. 2 is an illustrative representation of an image engine according to one embodiment.

FIG. 4 is a flow chart of a hard imaging method according to one embodiment.

FIG. 5 is a flow chart of a hard imaging method according to one embodiment.

DETAILED DESCRIPTION

Imaging parameters of imaging devices may change (e.g., susceptible to drift) during imaging operations due to a change in a machine state of the imaging device during imaging operations. For example, generated heat, wearing of components, or other factors may cause changes to the state of an imaging device. The changes may adversely impact imaging operations, for example, negatively impact color consistency. One imaging parameter which may affect color consistency is dot gain and dot gain may change over time during imaging operations of a given device. At least some embodiments described below use partial measurements of dot area coverage and extrapolate other coverage values from the measured value(s). Look up tables (LUTs) are used in one embodiment to account for dot gain and some embodiments described below extrapolate unmeasured values of dot coverage from a few measured values of different dot coverages. In one embodiment, function fitting is used to estimate a function that computes a complete corrected dot gain LUT (e.g., fifteen dot coverage values in one embodiment) from a current LUT and the measured points. The exemplary embodiment accommodates changes to dot gain over time enabling improved imaging operations of imaging devices.

Figure 1:
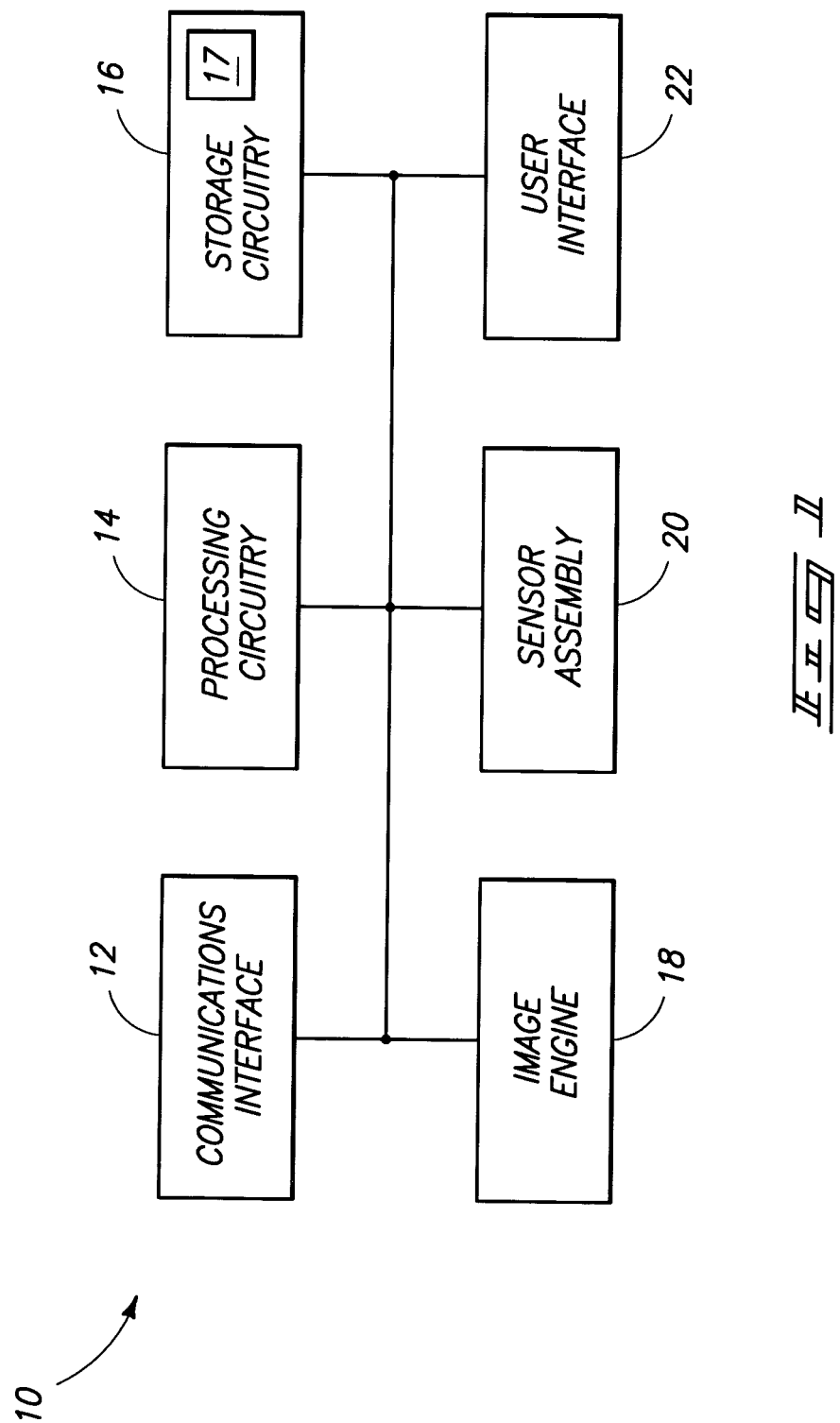
FIG. 1 is a functional block diagram of an image forming device according to one embodiment.

Referring to FIG. 1, an imaging device is depicted according to one embodiment with respect to reference sign 10. In one embodiment, the imaging device 10 may be configured as a digital imaging device configured to access and/or generate digital image data to form hard color images upon media, such as paper, labels, transparencies, etc. For example, the imaging device 10 may be configured as a digital press, such as an HP Indigo 5000 digital printing press available from Hewlett-Packard Company, in one exemplary arrangement.

In the illustrated embodiment, imaging device 10 includes a communications interface 12, processing circuitry 14, storage circuitry 16, image engine 18, sensor assembly 20, and a user interface 22 electrically coupled with one another, for example, via a bus. Other configurations are possible including more, less and/or alternative components.

Communications interface 12 is arranged to implement communications of imaging device 10 with respect to external devices (not shown), such as a computer. For example, communications interface 10 may be arranged to communicate information bi-directionally with respect to external devices. Communications interface 10 may be implemented as a network interface card (NIC), serial or parallel connection, USB port, Firewire interface, flash memory interface, floppy disk drive, or any other suitable arrangement for communicating with respect to imaging device 10. According to some examples, communications interface 10 may be coupled with a host or a network. In another example, imaging device 10 may operate as a stand-alone imaging device without a host or network.

In one embodiment, processing circuitry 14 is arranged to process data (e.g., access, generate and/or process digital image data corresponding to a color image to be hard imaged upon media), control data access and storage, issue commands, monitor imaging operations and/or control imaging operations (e.g., control imaging operations and/or implement calibration operations responsive to monitoring as described below in exemplary embodiments). Processing circuitry 14 may comprise circuitry configured to implement desired programming provided by appropriate media in at least one embodiment. For example, the processing circuitry 14 may be implemented as one or more of a processor and/or other structure configured to execute executable instructions including, for example, software and/or firmware instructions, and/or hardware circuitry. Exemplary embodiments of processing circuitry 14 include hardware logic, PGA, FPGA, ASIC, state machines, and/or other structures alone or in combination with a processor. These examples of processing circuitry 14 are for illustration and other configurations are possible.

The storage circuitry 16 is configured to store programming such as executable code or instructions (e.g., software and/or firmware), electronic data (e.g., image data), databases, look up tables, or other digital information and may include processor-usable media. Processor-usable media includes any computer program product or article of manufacture 17 which can contain, store, or maintain programming, data and/or digital information for use by or in connection with an instruction execution system including processing circuitry 18 in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 16 described above and/or communicated via a network or using other transmission media and configured to control appropriate processing circuitry 14. For example, programming may be provided via appropriate media including for example articles of manufacture 17, embodied within a data signal (e.g., modulated carrier wave, data packets, digital representations, etc.) communicated via an appropriate transmission medium, such as a communications network (e.g., the Internet and/or a private network), wired electrical connection, optical connection and/or electromagnetic energy, for example, via communications interface 12, or provided using other appropriate communication structure or medium. Exemplary programming including processor-usable code may be communicated as a data signal embodied in a carrier wave in but one example.

Image engine 18 is configured to implement electrophotographic imaging operations to form and develop latent images in one possible embodiment. The image engine 18 may be configured to generate black and white and/or color images using marking agents. Image engine 18 utilizes marking agents such as liquid inks in one embodiment although other types may be used in other embodiments. Other configurations of image engine 18 for forming images upon media are possible. An exemplary configuration of image engine 18 implemented as an electrophotographic image engine is shown in FIG. 2.

Imaging device 10 may also include a sensor assembly 20 positioned along a paper path at a location downstream from image engine 18 in one embodiment. Sensor assembly 20 is configured to monitor hard images formed upon media by image engine 14. Sensor assembly 20 may comprise a densitometer in one embodiment configured to sense a hard color image and provide electrical signals indicative of an optical characteristic at one or more spatial locations of a hard color image. The optical characteristic may be related (e.g., proportional) to image thickness at the respective spatial location(s) of the hard color image. Processing circuitry 14 may use the signals to calculate the optical characteristic comprising optical density at the respective location(s) of the hard color image in one embodiment. In addition, processing circuitry 14 may calculate a coverage (0-100%) of a marking agent at a desired location of the hard color image in one embodiment. Processing circuitry 14 may implement dot gain calibration operations, adjust imaging operations and/or perform other desired actions using the output from sensor assembly 20 in possible embodiments as described further below.

User interface 22 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface 50 may include a display (e.g., cathode ray tube, LCD, etc.) configured to depict visual information and an audio system as well as a keyboard, mouse and/or other input device. Any other suitable apparatus for interacting with a user may also be utilized.

Referring to FIG. 2, additional details of an exemplary electrophotographic image engine 18 configured to implement printing are shown according to one embodiment. In the illustrated exemplary configuration, image engine 18 includes a plurality of drums including intermediate transfer drum 24, an impression drum 26, and a photoconductive drum 28. Other configurations of image engine 10 are possible.

Photoconductive drum 28 is arranged to rotate in a counterclockwise direction during imaging operations. A charge roller 30 of image engine 18 is arranged to provide an electrical charge upon a photoconductive surface of drum 28 and a writing head (not shown) may generate a laser beam 32 to selectively discharge portions of the charged surface of drum 28 to form latent images. Processing circuitry 14 may access and generate appropriate image data to control the writing head to form desired images in one embodiment. In a more specific exemplary embodiment, processing circuitry 14 utilizes image data to determine a plurality of imaging coverage values which define the areas of dots, also referred to as coverages, to be formed upon media 38 to generate hard images.

A development assembly 34 may contain a plurality of developers to provide marking agents to the surface of drum 28 to develop the latent images formed thereon. In some exemplary color implementations, the marking agents may be provided simultaneously or in different separations. Following development using the marking agent(s), developed images are transferred to intermediate transfer drum 24. A cleaning station 36 may be provided to remove any marking agent not transferred to drum 24 and thereafter subsequent latent images may be formed and developed.

In the illustrated embodiment, media 28 traveling along a paper path of imaging device 10 passes between intermediate transfer drum 24 and impression drum 26. The intermediate transfer drum 24 transfers developed images from photoconductive drum 28 to media 38 in the depicted embodiment. According to the illustrated arrangement of imaging device 10, the media 28 may receive a plurality of colors of different separations on a single pass through drums 24, 26. In other embodiments, different color separations may be separately applied to photoconductive drum 28 in respective revolutions of drum 28. Alternative configurations of image engine 18 in addition to the arrangement of FIG. 2 are possible in other embodiments. For example, photoconductive drum 28 may be implemented as a belt in an alternative embodiment.

As mentioned previously, the machine state of image forming device 10 may change during imaging operations and the changes may negatively impact imaging operations. For example, actual dot sizes printed upon media may change as a function of various parameters of device 10 which may include temperatures of device components or conductivity of the marking agents. The changes in dot gain may negatively impact color consistency of formed hard images. Accordingly, at least one embodiment of the disclosure is directed towards compensating for machine state drift.

Accordingly, in one embodiment, a dot gain table may be generated to reduce effects resulting from dot gain. In one embodiment, the processing circuitry 14 processes image data to form the hard images and the processing of image data provides specified coverage values which define amounts of one or more marking agents to be provided at a given location of media to form dots of the hard image being formed. For color images, a plurality of specified coverage values define the amounts of respective ones of the different color marking agents which are to be provided at a given location to form a desired color corresponding to the image data. A dot gain look up table (LUT) may be used to account for dot gain in one embodiment. One LUT comprises information which associates specified coverage values (corresponding to coverages of dots to be formed) with resultant coverage amounts actually formed upon media responsive to respective ones of the specified coverage values. The LUT may be used to provide correction for dot gain by associating actual coverages which result from respective specified digital coverages. The LUT may be addressed to associate physical printed dot areas with requested dot areas. In one embodiment, the processing circuitry 14 addresses different portions of the LUT using the specified coverage values to identify respective imaging coverage values which are to be used to control image engine 18 as opposed to usage of the specified coverage values to control image engine 18. The imaging coverage values accommodate the dot gain during the formation of hard images.

The dot gain LUT may be calculated in a full LUT measurement procedure by controlling the image engine 18 to print a plurality of dots of different digital area coverages and measuring the printed dots (e.g., using a densitometer of sensor assembly 20) to determine the actual coverages (dot areas) which result from the printing. To implement a full calibration (full LUT measurement procedure) according to one embodiment, the dot gain compensation is deactivated and monochromatic swatches of uniform dot area for plural dot areas (e.g., such as the above-mentioned fifteen points) spanning the tonal spectrum are printed for each ink separation. In addition, the swatches may be printed for desired combinations of media substrates and screens. The sensor assembly 20 is configured to determine optical density of the respective swatches and the processing circuitry 14 may determine measured values indicative of the dot areas for respective ones of the swatches. Thereafter, a full LUT may be generated using the measured values and used to implement dot gain compensation. The LUTs resulting from the full calibration operations may be used to determine the reference LUT in one embodiment. Interpolation of bounding coverage values may be used to implement dot gain compensation for specified coverage values which are not specifically present in the LUTs in one embodiment.

The LUT associates the physical printed dot areas with the requested dot areas. In one embodiment, the LUT has fifteen points corresponding to different specified coverage values to be formed. Exemplary specified coverage values which may be used as input to an LUT include 2, 4, 6, 9, 12, 14, 16, 18, 23, 27, 33, 40, 50, 65 and 80 (i.e., corresponding to digital dot areas where 0 is no coverage and 100 is maximum coverage) in one embodiment. Dot gain LUTs may be formed for different combinations of separations, substrates and/or screens (HDI-160, HDI-175, HDI-180, HDI_set_2, and Sequin) in one embodiment.

Over time, the machine state of the image forming device 10 may change a sufficient amount leading to changes in dot gain. The look up table may be recalculated to provide acceptable hard imaging. The recalculated LUT may thereafter be used by the processing circuitry 14 to implement subsequent imaging operations.

At least one aspect provides a method and apparatus configured to estimate the dot gain after a full LUT measurement procedure. The estimation of the dot gain may be used in one embodiment to implement operations with respect to recalculation of the dot gain LUT. For example, the estimation of the dot gain may be used at different moments of time occurring between different full LUT measurements. The dot gain estimation operations may enable the full LUT measurements to be performed at less frequent periods of time while maintaining acceptable print quality in some embodiments. These estimation embodiments use less amounts of media and marking agent to implement dot gain calibration operations in one embodiment.

According to one dot gain estimation embodiment, previously generated dot gain LUTs generated for a respective imaging device 10 may be stored and used for subsequent estimation operations. For example, a reference LUT may be generated which is an average of previously calculated LUTs in one embodiment. In another embodiment, the reference LUT is a weighted average of the previous LUTs which relate specified coverage values and coverage amounts actually printed upon media. A weighted average reference LUT may be calculated using a weighted average with exponential decay factor with a decay of 0.8 and a floor of 0.001 in one embodiment. The stored LUTs may be referred to as stored data.

In one embodiment, only dot gain LUTs used by a respective device 10 are used to generate the reference LUT. In other embodiments, or perhaps prior to the existence of a sufficient number of LUTs for a given device 10, dot gain LUTs for another device may be used to generate the reference LUT. In one example, at least thirty existing dot gain LUTs for a respective image engine 18 are used to generate a reference LUT. The LUT calculated by a full LUT measurement procedure may be referred to as a measured LUT and enables dot gain correction at a respective initial moment in time. As mentioned previously, the machine state of imaging device 10 may change over time and imaging device 10 may perform estimation functions using the reference LUT to provide new LUTs (referred to as corrected LUTs) for use to provide dot gain correction at moments in time after the initial moment in time. Measured LUTs and corrected LUTs which are used at a present moment in time (i.e., the last LUT to be used) may be referred to as current LUTs.

In one estimation embodiment, imaging device 10 may apply function fitting to estimate a transfer function that computes a complete new corrected dot gain LUT from the reference LUT and one or more measured point. The procedure estimates parameters of the transfer function from measured coverage points and the function may be used to estimate the new corrected dot gain LUT. The new corrected dot gain LUT may be used at subsequent moments in time after the initial moment in time to accommodate the changes in machine state after the initial moment in time. The transfer function modifies the reference LUT to provide the corrected LUT in one embodiment.

Figure 3A:
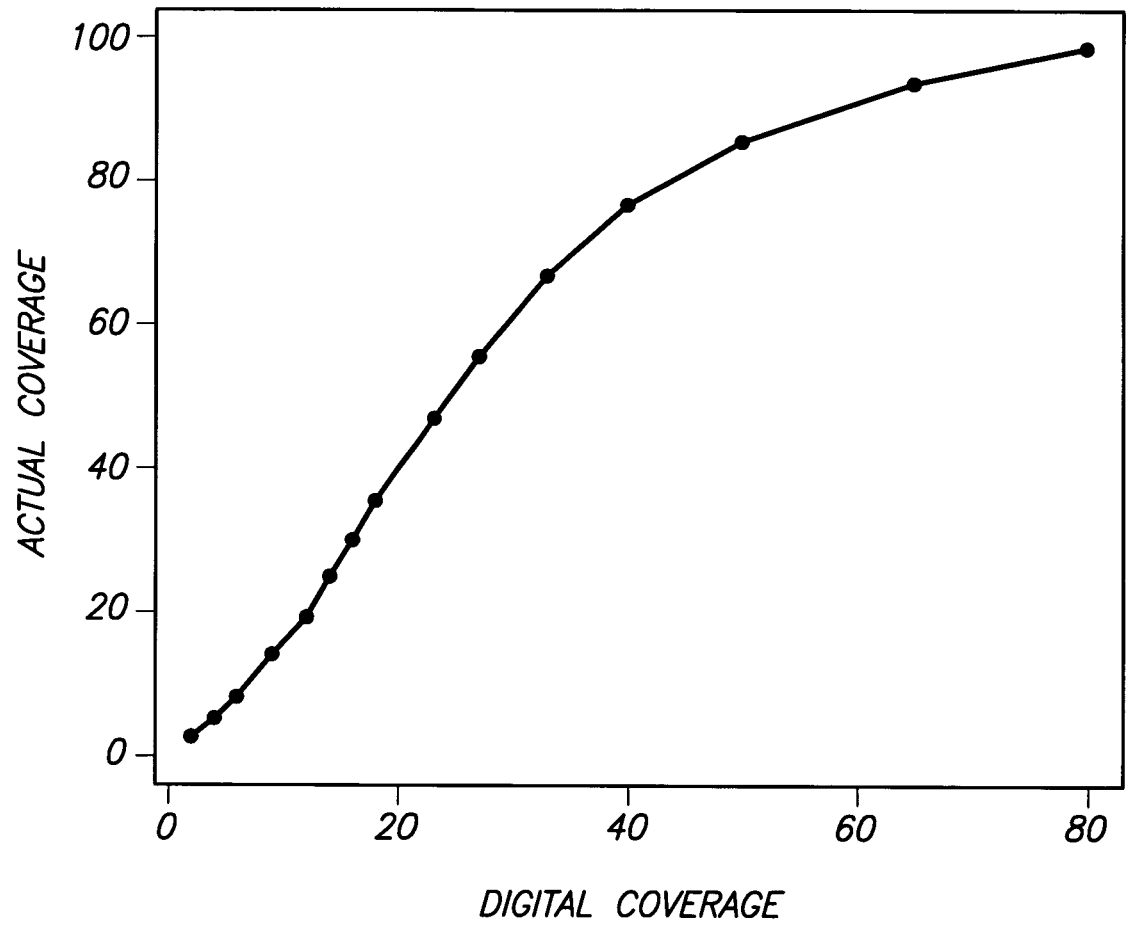
FIGS. 3a and 3b are graphical representations of an exemplary dot gain LUT and an exemplary LUT transfer function, respectively, according to one embodiment.
Figure 3B:
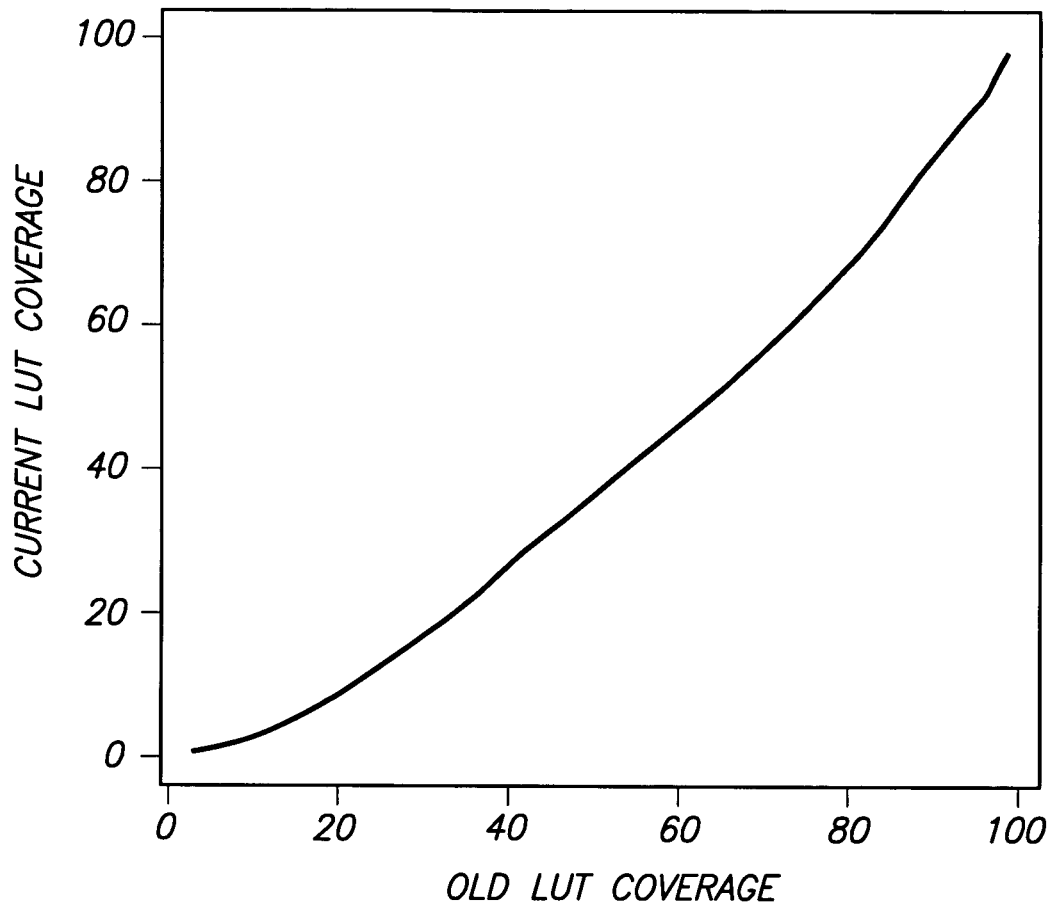

Referring to FIG. 3A, one example of a dot gain LUT is shown providing a relationship of digital coverage values with respect to actual coverage values. It does not appear that there is a simple function that characterizes the LUT. However, as shown in FIG. 3B, the mapping from one measured LUT to another can be characterized by a relatively simple function and one embodiment of the disclosure estimates the parameters of the function. Polynomial functions provide relatively good approximation of the function with higher number polynomials providing improved fits. Significant improvement in residual estimation errors were observed between quadratic and third order polynomials, but the difference in errors was less significant between third and fourth order polynomials. Both second and third order polynomials provide acceptable fits with acceptable error but the third order polynomials approximate the function considerably better than second order polynomials.

The discussion proceeds with respect to extrapolation of the complete new corrected LUT for one of the colors of the marking agents from one or more (e.g., three) measured points. One or more measured values may be determined by printing one or more test images having desired or specified coverage(s) of the marking agent for the respective colorant (without dot gain correction) and measuring the coverage(s) of the test image(s) providing the measurement data or value(s) indicative of the measured coverage(s). In one embodiment, one point or three points having respective coverages were printed, measured and used to extrapolate the complete new corrected LUT. It is desired to select the measured points which give the lowest prediction error during extrapolation in one embodiment. Two measures of prediction error (Mean Squared Error and/or Max Standard Deviation) may be used to rank coverage points and the measures provide dot area 23 as a desired measured point for use in one point measurement and dot areas 6, 14, 40 for use in three points of measurement in one embodiment (e.g., a highest residual error confidence interval may be used as a measure of estimation quality in one embodiment). Other numbers of measured points or different measured points may be used in other embodiments.

One possible method of formulating a new corrected LUT using one measured point is discussed below. In one embodiment, the new corrected LUT is generated using correction information in the form of the transfer function which may also be referred to as relationship function. The correction information is indicative of a change of the dot gain after the calculation of the LUT which resulted from the previous full LUT measurement operation. In the described example, the transfer function is estimated as opposed to a curve of the new LUT. The reference LUT is given by a number of input and output values Tx and Ty. Then, the new LUT is given by:

$$\begin{cases} T_x^{new} = T_x \\ T_y^{new} = Q(T_y) \end{cases} \quad (1)$$

The function $Q(x)$ may be estimated by printing a desired coverage $x_0$ (e.g., 23% dot area) for a single measurement point for one of the colorants upon media. The described method may be repeated for other colorants. The printed sample is analyzed by the sensor assembly 20 to provide measurement data in the form of a measured value $Q_0$ different than the desired coverage number (i.e., some number other than 23% due to being uncalibrated). While one measured point is insufficient to estimate or fit a curve, the addition of restrictions provides solutions of a quadratic equation in the presently described embodiment. A number of defined coverage values may be set as LUTTransferFn(0)=0 and LUTTransferFn(100)=100. The estimated transfer function goes through the set of points:

$$\begin{cases} x = 0; y = 0 \\ x = x_0; Q = Q_0 \\ x = 100; Q = 100 \end{cases} \quad (2)$$

i.e., transfers point $x_0$ into point $Q_0$. A model for such a function is a parabola:

$$Q(x) = ax^2 + bx \quad (3)$$

The above function satisfies a condition to pass through the origin and the second and third conditions of (2) above. These conditions provide the following system of linear equations:

$$\begin{cases} 100 = a*100^2 + b*100 \\ Q_0 = ax_0^2 + bx_0 \end{cases} \quad (4)$$

for a and b. In one embodiment, the linear equations are solved to provide the coefficients a and b of the transfer function and provide the function estimation:

$$\begin{cases} a = \dfrac{Q_0 - x_0}{x_0(x_0 - 100)} \\ b = \dfrac{x_0^2 - 100 Q_0}{x_0(x_0 - 100)} \end{cases} \quad (5)$$

A plurality of transfer functions may be generated corresponding to respective ink, substrate and/or screen combinations. Once a desired transfer function $Q(x)$ is calculated, the new corrected LUT may be determined via functional composition as follows:

$$L(x) = Q(R(x)) \quad (6)$$

where $R(x)$ is the reference LUT. As mentioned above, additional numbers of different coverage points may be measured in other embodiments. The plural measured points (e.g., three) may be used to provide the transfer function and coefficients a and b may be determined using a mean least square method with constraints $Q(\mathbf{0})=0$ and $Q(\mathbf{100})=100$ in one embodiment. Additional details regarding utilization of a plurality of measured points to provide the transfer function are described with respect to Table A. The function L(x) is the new corrected LUT which may be stored in storage circuitry 16 and may be used for dot gain compensation in one embodiment.

The above-described calibration process may be performed for desired combinations of colorants, media substrates, and screens in one embodiment. One or more points may be measured for each combination and respective reference LUTs corresponding to the combination may be utilized to reconstruct remaining points of the respective corrected dot gain LUTs. In the above-described embodiment, the process calculates the respective transfer function, which when applied on the respective reference LUT, passes through the measured point(s) and preserves the shape of the reference LUT.

The output of the transfer function are imaging coverage values which may be provided in a new corrected LUT (L(x)). The imaging coverage values may be used to directly control the image engine 18 and correspond to respective specified coverage values in one embodiment.

The above described example refers to use of one measured point. Other embodiments may utilize additional measured points as mentioned previously. Using two restrictions in the form of the above-mentioned defined coverage values and, for example three measured points or coverages, five points of the function are known. The points may be used to estimate a fourth order polynomial or to fit a second or third order polynomial. In one embodiment, the function fitting approach can result in estimates that smooth measurement noise resulting from sensor assembly 20. A three measured point estimation method fits five points to a third order polynomial in one embodiment. One possible procedure for applying this method to image forming device 10 is shown as pseudo-code in Table A. The code may be stored in storage circuitry 16 and is configured to specify how to update the dot gain LUT after a full LUT measurement as well as after partial measurement providing a respective corrected LUT. Other numbers of measured points may be used in other embodiments.

TABLE A

| Assumptions |
| --- |
| 1. There are 15 measured points in a full measured LUT. The coverage points (digital dot area or DDA) are 2, 4, 6, 9, 12, 14, 16, 18, 23, 27, 33, 40, 50, 65, 80.<br>2. There are 3 measured points in a partial measured LUT. The measured points are 6, 14, 40.<br>3. The estimated function lutTransferFn(x, a, b, c, d) {return a * $x^3$ + b * $x^2$ + c * x + d} |
| Initialization |
| 1. Set decay.factor = 0.8<br>2. Set decay.min = 0.001<br>3. Set LUTs = list of LUTs measured on the press ordered by measurement time from last to first.<br>4. Set the weight corresponding to each LUTs. weights[i] = decay.factor$^i$ (i from 0 to number of luts −1).<br>5. if any weight is lower than decay.min set it to decay.min<br>6. Set referenceLUT to the weighted average of the LUTs. |
| For a new full measured LUT |
| 1. concatenate the new LUT to the beginning of the list of LUTs<br>2. multiply all the weights by decay.factor<br>3. concatenate 1 to the beginning of the list of weights<br>4. if any weight is lower than decay.min set it to decay.min<br>5. Set referenceLUT to the weighted average of the LUTs<br>6. set the machine LUT to be used in the device to the measured LUT |
| For a new partial measurement (pLUT) - 3 points |
| 1. Set the 5 data points (0, 0), (100, 100), (referenceLUT[6], pLUT[1]), (referenceLUT[14], pLUT[2]), (referenceLUT[40], pLUT[3])<br>2. Compute the nonlinear least squares estimates of a parameters third order polynomial function. That is, estimate a, b, c, and d in the function lutTransferFn (A function nls in R may be used. The nls function uses a relative-offset convergence criterion that compares the numerical imprecision at the current parameter estimates to the residual sum-of-squares described in Bates D. M., D. G. and Watts, Nonilnear Regression Analysis and Its Appilcations (Wiley 1988). We initialized the parameters to list(a = 1, b = 1, c = 1, d = 0). The optimization control parameters were set as follows: the maximum number of iterations = 50, the tolerance level for the relative offset convergence criterion = 1e−01, the minimum step-size factor allowed on any step in the iteration = 1/1024.)<br>3. Compute the full LUT. For the ith DDA value lut[i] = lutTransferFn(referenceLUT[i], a, b, c, d); (Another possibility is to compute only the missing DDA values.)<br>4. Set the machine LUT to be used in the device to the LUT computed in step 3. |

The estimation of the complete corrected LUT using the transfer function as described in the above embodiment may be used in conjunction with the full LUT measurement process in one embodiment. In one embodiment, the image forming device 10 is recalibrated using the full LUT measurement procedure at desired intervals and the above-described estimation operations may be performed at desired intervals between executions of the full LUT measurement process. For example, in one more specific embodiment, the full LUT measurement process is performed after 50,000 impressions of device 10 and the function fitting operations to calculate the transfer function and the corrected LUT may be performed after 6,000 impressions. Other intervals may be used in other embodiments.

It may be desired to calibrate developer voltages of image engine 18 prior to performing the above-described dot gain calibration operations. In one embodiment, the developer voltage parameter is calibrated using an iterative procedure which terminates when 100% optical density is accurate, for example as measured by a densitometer of sensor assembly 20.

Referring to FIG. 4, one method for implementing dot gain correction operations performed by processing circuitry 14 is described using stored data and the above-described transfer function. Other methods including more, less and/or alternative acts are possible.

At an act A10, the image data of an image to be formed is accessed.

At an act A12, a specified coverage value is determined from the image data and which defines a desired coverage of a dot of the image to be formed.

At an act A14, the stored data including a reference dot gain LUT is retrieved from the storage circuitry.

At an act A16, relationship information in the form of the transfer function corresponding to the change of the machine state of the image forming device from a moment in time corresponding to the previously measured LUT (or corrected LUT) and the present moment in time is accessed. The relationship information updates the reference LUT to provide a new corrected LUT for use in printing the image.

At an act A18, the specified coverage value determined in act A12 is modified using the new corrected LUT to provide a modified coverage value.

At an act A20, the modified coverage value, also referred to as an imaging coverage value, is used to control the image engine to print a respective dot of the image.

Referring to FIG. 5, one method for implementing dot gain correction operations performed by processing circuitry 14 including usage of data regarding one (or more) measured point is shown. Other methods including more, less and/or alternative acts are possible.

At an act A30, stored data in the form of a full measurement dot gain LUT is accessed at a moment in time after a full LUT measurement procedure and before a corrected dot gain LUT is calculated.

At an act A32, the full measurement dot gain LUT is used to determine appropriate imaging coverage values for controlling the image engine to print an image.

At an act A34, the processing circuitry implements a procedure to generate the corrected dot gain LUT including the printing of a test image in the form of a patch having a specified coverage value for a given separation.

At an act A36, the printed test image is analyzed and the coverage of the printed test image is determined.

At an act A38, relationship information in the form of the transfer function is calculated using the coverage of the measured point of act A36 and used with stored data including a reference LUT to provide the corrected dot gain LUT.

At an act A40, the corrected dot gain LUT is used to control the printing of subsequent images.

In one embodiment, the calculation of the dot gain LUTs using the transfer functions provides results within acceptable error values. In addition, the calculation of the dot gain LUTs using the transfer functions according to one embodiment of the disclosure saves consumables and time compared with methods which perform full calibrations at intervals of increased frequency. For example, in one embodiment providing full LUT measurements every 50,000 impressions and three point measurements every 6,000 impressions, the resulting consumable waste is reduced from 0.5% of production to 0.3% of production providing a significant reduction in one example. Also, the above-described embodiment provides improved accuracy and color consistency in highlights and mid-tones compared with calibration procedures which attempt to bring a physical state of the device to the state when the last full LUT measurement procedure was conducted (e.g., one such procedure prints a dot of 75% coverage and the dot is measured with a densitometer to modify developer voltage and laser power to match the measured 75%).

The protection sought is not to be limited to the disclosed embodiments, which are given by way of example only, but instead is to be limited only by the scope of the appended claims.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

What is claimed is:

1. An image forming device, comprising:
   an image engine configured to provide a marking agent upon media;
   storage circuitry configured to store data comprising reference associations between specified dot coverage values of the marking agent and respective output dot coverage values;
   processing circuitry configured to perform operations comprising
   controlling the image engine to form a test image upon the media having a specified coverage of the marking agent and to access measurement data indicative of at least one measured dot coverage area of the marking agent of the test image;
   based on the measurement data, mapping the reference associations to updated associations between the specified dot coverage values and respective output dot coverage values; and
   controlling printing of imaging elements of a given image by the image engine based on the updated associations.

2. The device of claim 1, wherein the image engine is configured to provide the marking agent comprising a liquid marking agent upon the media.

3. The device of claim 1, wherein the reference associations are derived from measurement data obtained from images printed by the image engine before the test image.

4. The device of claim 1, wherein the processing circuitry is operable to determine a transfer function from measurement data indicative of a single measured dot coverage area, and to use the transfer function to map the reference associations to updated associations.

5. The device of claim 1, wherein the processing circuitry is configured to generate from the measurement data and the reference associations a transfer function that maps the reference associations to the updated associations between the specified dot coverage values and respective output dot coverage values.

6. A method comprising:
   storing data comprising reference associations between specified dot coverage values of the marking agent and respective output dot coverage values;

controlling an image engine to form a test image upon the media having a specified coverage of the marking agent and to access measurement data indicative of at least one measured dot coverage area of the marking agent of the test image;

based on the measurement data, mapping the reference associations to updated associations between the specified dot coverage values and respective output dot coverage values; and controlling printing of imaging elements of a given image by the image engine based on the updated associations.

7. The method of claim 6, further comprising deriving the reference associations from measurement data obtained from images printed by the image engine before the test image.

8. The method of claim 7, further comprising forming a plurality of test images having respective different coverages of the marking agent, and obtaining the measurement data for deriving the reference associations from measurements of the of coverages of the marking agent in the plurality of test patterns.

9. The method of claim 6, wherein the mapping comprises determining a transfer function from measurement data indicative of a single measured dot coverage area, and using the transfer function to map the reference associations to updated associations.

10. The method of claim 6, wherein the mapping comprises generating from the measurement data and the reference associations a transfer function that maps the reference associations to the updated associations between the specified dot coverage values and respective output dot coverage values.

11. At least one non-transitory computer-readable medium having processor-readable program code embodied therein, the processor-readable program code adapted to be executed by a processor to implement a method comprising:

storing data comprising reference associations between specified dot coverage values of the marking agent and respective output dot coverage values;

controlling an image engine to form a test image upon the media having a specified coverage of the marking agent and to access measurement data indicative of at least one measured dot coverage area of the marking agent of the test image;

based on the measurement data, mapping the reference associations to updated associations between the specified dot coverage values and respective output dot coverage values; and controlling printing of imaging elements of a given image by the image engine based on the updated associations.

12. The at least one computer-readable medium of claim 11, wherein the reference associations are derived from measurement data obtained from images printed by the image engine before the test image.

13. The at least one computer-readable medium of claim 11, wherein the mapping comprises determining a transfer function from measurement data indicative of a single measured dot coverage area, and using the transfer function to map the reference associations to updated associations.

14. The at least one computer-readable medium of claim 11, wherein the mapping comprises generating from the measurement data and the reference associations a transfer function that maps the reference associations to the updated associations between the specified dot coverage values and respective output dot coverage values.

* * * * *

UNITED STATES PATENT AND TRADEMARK OFFICE
CERTIFICATE OF CORRECTION

PATENT NO.         : 8,823,996 B2
APPLICATION NO.    : 11/591267
DATED              : September 2, 2014
INVENTOR(S)        : Gregory Braverman et al.

Page 1 of 1

It is certified that error appears in the above-identified patent and that said Letters Patent is hereby corrected as shown below:

Title Page, item (12), "Braveman et al." should read -- Braverman et al. --.

Title Page, item (75), Inventors, in column 1, line 1, delete "Braveman," and insert -- Braverman, --, therefor.

In the Claims

In column 12, line 43, in Claim 1, delete "values;" and insert -- values, --, therefor.

In column 13, line 19, in Claim 8, before "coverages" delete "of".

Signed and Sealed this
Sixth Day of January, 2015

Michelle K. Lee
*Deputy Director of the United States Patent and Trademark Office*